Dec. 9, 1947.     J. R. THORP     2,432,262
STEERING WHEEL SPINNER KNOB
Filed April 22, 1946
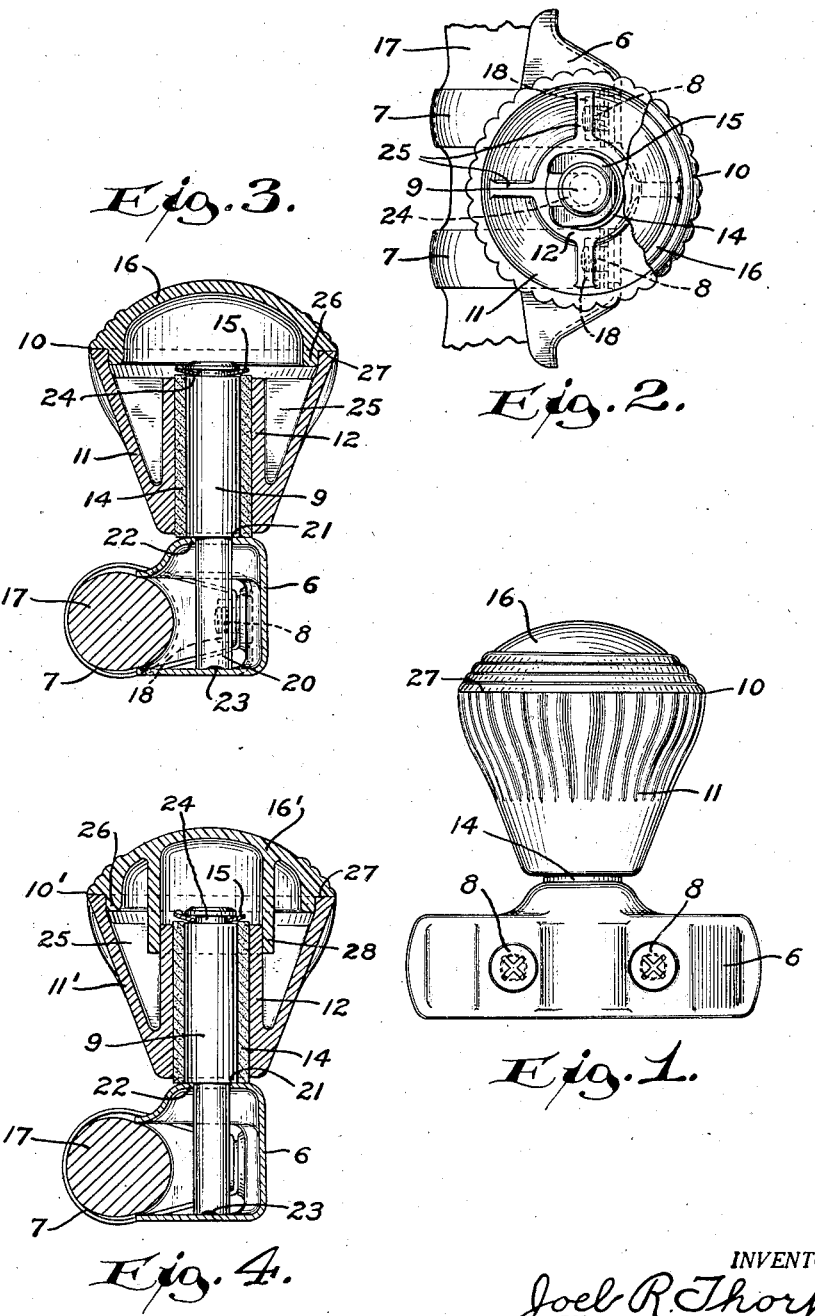
INVENTOR.
Joel R. Thorp
BY
Lieber & Lieber
ATTORNEYS.

Patented Dec. 9, 1947

2,432,262

UNITED STATES PATENT OFFICE 2,432,262

STEERING WHEEL SPINNER KNOB

Joel R. Thorp, West Allis, Wis., assignor to The Fulton Company, West Allis, Wis., a corporation of Wisconsin Application April 22, 1946, Serial No. 663,912

6 Claims. (Cl. 74—557)

The present invention relates generally to improved means for facilitating the controlled guidance of vehicles, and relates more specifically to improvements in the construction and operation of vehicle steering wheel spinner knobs.

The primary object of my invention is to provide an improved spinner knob for vehicle steering wheels or the like, which is simple and durable in construction and highly effective in use.

Many different types of knobs or handles adapted for application to the rims of vehicle steering wheels in order to facilitate rotation of the wheels while controlling the direction of travel of the vehicles, have heretofore been proposed and used quite extensively; and while some of these prior so-called spinner knobs have been quite satisfactory, most of them are relatively flimsy and weak in structure, or too complicated and difficult to manufacture and to apply, or rather cumbersome to manipulate during normal use. In order to insure utmost safety in devices of this kind, the knob should be capable of firm attachment to the steering wheel rim so that no subsequent looseness will develop, and the bearing between the knob and its supporting spindle should also be of durable construction and susceptible of effective lubrication in order to insure maximum life of the assemblage. Then too, it has been found preferable in accessories of this class, not to permit the knob to spin too freely relative to its support, and these devices should also be readily applicable to standard steering wheels of various types and should furthermore be as attractive as possible.

It is therefore a more specific object of the present invention to provide an improved spinner knob assemblage which embodies all of the above-mentioned desirable features, and which may be manufactured and sold at moderate cost.

Another specific object of this invention is to provide an improved spinner knob and bearing assembly wherein undesirably free spinning of the knob is avoided and which may be conveniently lubricated and is not subject to rapid wear.

A further specific object of the invention is to provide a light and attractive but exceedingly strong spinner knob accessory the various parts of which may be readily constructed and assembled, and which may be quickly and conveniently applied to the rims of various types of steering wheels.

Still another specific object of my invention is to provide an improved spinner knob wherein a durable bearing is mounted and thoroughly concealed within a strong sectional plastic shell, and is engaged at its opposite ends by resilient elements for effectively controlling the spinning action while positively eliminating end play.

These and other specific objects and advantages of the invention will be apparent from the following detailed description.

A clear conception of the several features constituting my present improvements, and of the mode of constructing, assembling and of utilizing spinner knobs embodying the invention, may be had by referring to the drawing accompanying and forming a part of this specification wherein the reference characters designate the same or similar parts in the various views.

Fig. 1 is a side elevation of a typical spinner knob embodying the present invention, looking toward the clamping screw side of the attaching and supporting bracket;

Fig. 2 is a top view of the typical spinner knob assemblage of Fig. 1, with a portion of the cover or cap, section of the knob casing broken away so as to reveal normally concealed parts;

Fig. 3 is a central vertical section through the spinner knob assemblage of Figs. 1 and 2, showing the cap and body sections of the knob casing united at the periphery only of the cap section; and Fig. 4 is a central vertical section through a slightly modified spinner knob assembly wherein the cap is fastened to both the periphery and hub of the main body section.

While the invention has been shown and described herein as having been embodied in a spinner knob of a particular attractive shape and especially applicable to the rims of standard automobile steering wheel rims, it is not my desire or intent to thereby unnecessarily restrict or limit the utility of the improved features.

Referring to the drawing, the typical spinner knob assemblage shown in Figs. 1 to 3 inclusive, comprises in general a mounting and supporting base or bracket 6 provided with a pair of spaced attaching straps 7 and cooperating clamping screws 8, and having a spindle or stub shaft 9 firmly secured thereto between the straps 7; and a gripping knob 10 having a lower main section or body 11 provided with a central hub 12 snugly embracing a special tubular bearing 14 which coacts with and is retained upon the shaft 9 by a spring clip 15, and also having a top closure or cap 16 enclosing the bearing 14 and the retainer clip 15.

The main base or bracket 6 is preferably formed of resilient sheet metal with the aid of punches and dies; and the opposite ends of this bracket 6 remote from the column shaft 9, are adapted to be firmly clamped to one side of the rim 17 of a steering wheel or the like, by the two flexible straps 7 coacting with the opposite side of the rim 17, see Figs. 2 and 3. Each of the straps 7 has one end provided with a screw threaded block 18 and its opposite end perforated and bent to overlap the block end, and the clamping screws 8 coact with the bracket 6 and with the adjacent blocks 18 and may be readily manipulated with a screw driver so as to insure firm clamping of the bracket to the wheel rim 17.

The lower end 20 of the knob supporting post or shaft 9 is of reduced diameter so as to provide a shoulder 21 adapted to engage a resilient flange 22 formed integral with the upper central portion of the bracket 6; and the lower extremity of the shaft end 20 is preferably firmly secured by a weld 23 or otherwise, to the bottom of the main bracket 6, thus rigidly uniting the shaft 9 and bracket 6. The upper end of the stub shaft 9 is provided with an annular groove or recess 24 formed in the solid shaft directly above the upper end of the bearing bushing 14, and into which the U-shaped arcuate spring clip 15 may be easily inserted, as clearly indicated in Figs. 2 and 3. The prongs of the clip 15 project outwardly beyond the shaft periphery as shown in Fig. 2, and when this resilient clip has been properly inserted, it cannot slide out of place.

The shell sections 11, 16 of the knob 10 are preferably formed of durable plastic and are artistically colored and decorated to produce an attractive appearance, and the central hub 12 of the lower section 11 is rigidly connected with the outer shell by means of integral ribs 25. The bearing sleeve 14 is preferably formed of porous material such as compressed powdered iron, and may be firmly secured within the hub 12 during molding of the knob section 11, so that the plastic will become embedded within the porous outer surface of the bearing. The upper and lower ends of the tubular bearing 14 preferably project slightly beyond the hub 12 while the bore of the bearing sleeve snugly embraces the upper enlarged portion of the shaft 9; and the extreme flat end surfaces of the bearing bushing are resiliently engaged by the spring clip 15 and the resilient bracket flange 22, thus eliminating vertical play and frictionally restraining the free spinning motion of the knob 10.

As shown in Figs. 2 and 3, the peripheral portion of the cap section 16 of the knob 10, is provided with an annular flange 26 and with an adjacent annular flat surface 27 adapted to snugly cooperate with a bore and similar surface formed on the upper end of the body section; and after the spinner knob structure has been properly assembled the cap section 16 may be permanently cemented to the lower section 11 so as to conceal and protect the upper end of the bearing assemblage and the clip 15. As shown in Fig. 4, the cap section 16' of the modified knob 10' and the lower body section 11', are likewise provided with annular peripheral surfaces of coaction, but an additional union between the sections 11', 16' is furnished by providing a tubular flange 28 formed integral with and depending from the central portion of the cover and snugly embracing the upper end of the bearing confining hub 12. This additional flange 28 serves to center the sections 11', 16' and may also be cemented to the hub 12 to provide an additional union between the two sections of the plastic knob 10'.

When the various parts of the improved spinner knob accessory have been properly constructed, the knob supporting shaft 9 may be readily rigidly attached to the bracket 6 by applying the weld 23, whereupon the knob bearing 14 which is firmly embedded in the plastic of the hub 12 may be slipped over the upper shaft end, and the resilient clip 15 may be slid into the shaft recess 24, thus completing the major portion of the assembly. The cap section 16 may thereafter be firmly cemented to the lower main section 11 to conceal the bearing, and the straps 7 and screws 8 may be applied to the bracket 6 and to a steering wheel rim 17 in an obvious manner, either within or outside of the rim. Before final clamping of the accessory to the steering wheel, the knob 10 should preferably be partially inverted and a few drops of oil should be applied to the lower end of the powdered iron bearing 14, and due to the porosity of this bearing it will readily absorb sufficient lubricant to maintain the bearing surfaces properly lubricated for a long period of time.

During normal use of the improved assemblage, the knob 10 may be gripped at the will of the operator to revolve the steering wheel rim 17 in either direction, in a well known manner. The resilient pressure exerted upon the opposite ends of the bearing sleeve 14 by the spring clip 15 and the flange 22, while preventing free spinning of the knob 10, will permit free rotation of the shaft 9 within the self lubricating bearing with very little effort on the part of the operator. This resilient restraining action prevents excessive wear and looseness in the bearing, and the spaced clamping straps 7 insure a rigid mounting for the bracket 6 upon the wheel rim 17 at all times.

From the foregoing detailed description, it will be apparent that my present invention provides an improved steering wheel spinner knob assemblage which besides being simple and durable in construction, is highly effective in use and can be readily applied to various types of standard vehicle steering wheels. The improved powdered iron bearing 14 and its association with the supporting shaft 9, bracket 6 and clip 15, is an important feature of the present invention and positively prevents undesirable lost motion between the bearing elements. In the improved assemblage the use of several spaced clamping straps 7 also aids in eliminating looseness of parts and insures a rigid mounting for the knob, and the compressed powdered iron bearing due to its porosity, makes it possible to maintain most effective lubrication of the bearing surfaces at all times.

The sectional formation of the knob 11 permits convenient assembly of the spinner knob accessory and the cap 16 finally most effectively seals and protects the bearing against possible damage, and the plastic sections of the knob may be readily united by cementing so as to prevent subsequent tampering with the internal structure. The improved U-shaped and curved spring clip 15 is also an important feature of the present invention, and this clip while being easily insertible within the shaft recess 24 with but slight pressure, cannot slip out of place since the projecting prongs of the clip will engage the upper shaft end and will positively prevent displacement of the clip even after the length of the bearing 14 has been somewhat reduced by wear. The formation of the clip confining recess 24 directly in the stub shaft 9 also materially simplifies the structure and eliminates the use of nuts or other clip retaining fasteners which might become loose and thus release the clip 15. The improved knobs, besides presenting a neat and highly finished appearance, may be manufactured and sold at moderate cost, and have proven highly satisfactory and successful in actual commercial use.

It should be understood that it is not desired to limit this invention to the exact details of construction or to the precise mode of use, herein shown and described, for various modifications within the scope of the appended claims may occur to persons skilled in the art.

I claim:

1. In a steering wheel spinner knob, a supporting bracket having a resilient upper flange and an integral bottom beneath said flange, a stub shaft having a reduced lower end passing through said flange and rigidly attached to said bottom, a gripping knob having a central compressed iron bearing bushing the lower end of which coacts with said bracket flange and the bore of which is journalled on said shaft, and means resiliently engaging the upper end of said bushing.

2. In a steering wheel spinner knob, a supporting bracket having a resilient upper flange and an integral bottom beneath said flange, a stub shaft having a reduced lower end passing through said flange and rigidly attached to said bottom, a gripping knob having a central compressed iron bearing bushing the lower end of which coacts with said bracket flange and the bore of which is journalled on said shaft, and means carried by the upper end of said shaft and coacting with said bushing to constantly resiliently urge the latter against said flange.

3. In a steering wheel spinner knob, a supporting bracket having a resilient flange and a stub shaft secured to the bracket and provided with a bearing portion projecting upwardly away from said flange, a gripping knob having a porous metal bearing bushing journalled upon said shaft bearing portion and engaging said flange, and resilient means carried by said shaft and constantly urging said bushing against said flange.

4. In a steering wheel spinner knob, a supporting bracket having a resilient flange and a stub shaft secured to the bracket and provided with a bearing portion projecting upwardly away from said flange, a gripping knob having a lower plastic section moulded about a porous metal bearing bushing which embraces said shaft bearing portion and engages said flange and also having a closure cap section for concealing said bushing from above, and resilient means carried by said shaft within said knob for constantly urging said bushing against said flange.

5. In a steering wheel spinner knob, a supporting bracket having a resilient flange and a stub shaft secured to the bracket and provided with a bearing portion projecting upwardly away from said flange, a gripping knob having a lower plastic section moulded about a porous metal bearing bushing which embraces said shaft bearing portion and engages said flange and also having a closure cap section for concealing said bushing from above, and resilient means carried by said shaft within said knob for constantly urging said bushing against said flange, said knob sections being permanently united after application of said resilient means to said shaft.

6. In a steering wheel spinner knob, a sheet metal supporting bracket having a resilient portion, a stub shaft having a bearing portion projecting upwardly away from said bracket, one end of said shaft bearing portion coacting with said resilient bracket portion and the opposite end thereof being provided with an annular recess, a gripping knob having a central bearing bushing journalled upon said bearing portion and the lower end of which coacts with said resilient bracket portion while the upper end thereof terminates at said recess, and a U-shaped arcuate spring clip coacting with said recess and with the adjacent bushing end to urge said bushing against said resilient bracket portion.

JOEL R. THORP.

REFERENCES CITED

The following references are of record in the file of this patent:

UNITED STATES PATENTS

| Number | Name | Date |
|---|---|---|
| 1,072,079 | Bellows | Sept. 2, 1913 |
| 1,614,603 | Dewise | Jan. 18, 1927 |
| 2,118,573 | Sinko | May 24, 1938 |
| 2,272,897 | Riesing | Feb. 10, 1942 |